United States Patent [19]

Kodama et al.

[11] Patent Number: 5,575,837
[45] Date of Patent: Nov. 19, 1996

[54] POLISHING COMPOSITION

[75] Inventors: Hitoshi Kodama; Shoji Iwasa, both of Aichi-ken, Japan

[73] Assignee: Fujimi Incorporated, Aichi-ken, Japan

[21] Appl. No.: 539,502

[22] Filed: Oct. 6, 1995

Related U.S. Application Data

[63] Continuation of Ser. No. 229,560, Apr. 19, 1994, abandoned.

[30] Foreign Application Priority Data

Apr. 28, 1993 [JP] Japan ................................. 5-103059
Feb. 18, 1994 [JP] Japan ................................. 6-021197

[51] Int. Cl.$^6$ .................................................... C09K 13/00
[52] U.S. Cl. ........................... 106/3; 156/636.1; 252/79.1
[58] Field of Search ......................... 106/3; 51/307, 51/308; 252/79.1; 156/636, 645, 662, 664, 657, 636.1

[56] References Cited

U.S. PATENT DOCUMENTS

| | | | |
|---|---|---|---|
| 3,385,682 | 5/1968 | Lowen | 106/3 |
| 3,429,080 | 2/1969 | Lachapelle | 106/3 |
| 4,944,836 | 7/1991 | Beyer et al. | 156/645 |
| 5,032,203 | 7/1991 | Dou et al. | 156/345 |
| 5,376,222 | 12/1994 | Miyajima et al. | 156/636 |

FOREIGN PATENT DOCUMENTS

| | | | |
|---|---|---|---|
| 5344273 | 11/1978 | Japan . | |
| 55-48694 | 12/1980 | Japan | 252/79.1 |

OTHER PUBLICATIONS

Derwent Abstract 600354: corresponding to JP 53–44 273 B, Nov. 28, 1978.

*Primary Examiner*—Melissa Bonner
*Attorney, Agent, or Firm*—Ladas & Parry

[57] ABSTRACT

A novel polishing composition composed of water, sol or gel of silica as a polishing agent, and a polishing accelerator has been obtained. The accelerator could be a persulfate compound, a persulfate compound combined with hydrogen peroxide, or a hydrazine compound. Another polishing composition composed of water, other polishing agent than silica and a hydrazine compound as a polishing accelerator has also been obtained.

5 Claims, No Drawings

POLISHING COMPOSITION

This application is a continuation of copending application Ser. No. 08/229,560 filed on Apr. 19, 1994, now abandoned.

The present invention relates to a polishing composition and particularly relates to a polishing composition by which, the surface of circuit patterns of such metals as tungsten, aluminum, copper, or the like, or inter-layer insulating films of metal oxides formed on silicon substrates can be flattened at high speed and with high quality, as a technology to cope with the requirement of highly integrated VLSI devices.

Conventional examples of polishing compositions used for finishing mirror-surface of metal works are water slurries of such metal oxide powders as cerium oxide, aluminum oxide, chromium oxide, zirconium oxide, tin oxide, silicon dioxide or titanium dioxide or grinding stones of the same oxide powders.

However, with these polishing compositions, micro-scratch or orange peel is apt to be formed on the polished surface. Orange peel is a defect which is formed on the crystal surface by various unknown factors.

Flattening an inter-layer insulating film is coming to be recognized as an important technology in the process of multi-layer patterning in VLSI devices. Although a wide variety of technique for flattening inter-layer insulating film by use of film formation techniques of sputtering, CVD, heat treatment or the like have been proposed and utilized, no techniques have given a sufficient flatness to meet the requirement for higher integration of VLSI in future uses.

In order to suppress such micro-scratch or orange peel, it is necessary to adjust the concentration of polishing agent in the slurry, polishing time, polishing pressure and other operating conditions with high accuracy. This requires a high level of skill and is time consuming, and, hence, it is technically difficult and uneconomical to satisfy such a requirement.

In order to eliminate the above-mentioned shortcomings the present inventors have already disclosed the following polishing composition for metals in Japanese Patent Post-examination Publication or JP-B No. Sho-53-44273; that is: "Polishing composition for metals which is composed of silica sol as a polishing agent and oxidative compounds such as aqueous hydrogen peroxide, sodium peroxide, sodium perborate or the like."

This polishing composition is superior for polishing such metals as copper, aluminum, iron, stainless steel, titanium and so on, while it has a disadvantage that it is not effective for rigid metals such as tungsten.

In the case of a VLSI device different from the conventional silicon substrate, the material for the inter-layer insulating films are various oxides such as $SiO_2$ or the like, and therefore, stock removal rate is low, and orange peel is apt to be formed on the polished surface. Thus, there are many problems in practical use, and it is required to develop a polishing composition which is applicable to flattening the inter-layer insulating films.

It is therefore an object of the present invention to solve the above-mentioned problems in the prior art.

It is another object of the present invention to provide a polishing composition which can be applied to such rigid metals as tungsten, whereby the stock removal rate is increased without formation of surface defects, and by which inter-layer insulating films consisting of various oxides formed on a silicon substrate can be flattened with high stock removal rate and with high quality polished surface.

The inventors of the present invention eagerly made a thorough investigation to improve the above-mentioned polishing composition. In the investigation they tested polishing compositions composed of sol or gel of silica as a polishing agent and one of parsulfate selected from ammonium parsulfate, sodium parsulfate, or potassium persulfate or a combination of hydrogen peroxide with one of the afore-mentioned persulfate compounds. They also tried other polishing agents combined with a hydrazine compound selected from hydrazine hydrate, hydrazine carebonate, hydrazine acetate, hydrazine chloride or hydrazine sulfate as a polishing accelerator. Through various polishing tests on inter-layer insulating films using the above-mentioned polishing compositions, the inventors found that each of the polishing compositions showed extremely high performance, and arrived at the present invention.

By use of the polishing composition of this invention, stock removal rate in polishing metals or inter-layer insulating films is remarkably increased with little formation of defects on the polished surface. From measurement of metal removal quantity per unit, addition of persulfate in an amount as small as 1% by weight to the polishing composition is found to increase the stock removal rate remarkably. That is, in the process of maufacturing high performance VLSI (multi-layer devices) persulfate is preferable for polishing composition to be used to flatten circuit patterns of various metals formed on silicon substrates.

Also, in polishing an insulating layer of oxide film formed on silicon by use of a polishing composition including a polishing accelerator composed of a hydrazine compound, the stock removal rate is greatly increased in comparison with conventional compounds by interactional effect between the polishing agent and the accelerator, that is, so called chemical-mechanical polishing functions. In addition, it is possible to obtain a polished surface free of defects such as orange peel, micro scratch and so on, thus flattening of interlayer insulating films can be achieved with high quality surface, and since the yield of expensive multilayer VLSI devices can be improved, cost reduction can also be realized.

The present invention can also be applied to flattening a phosphate/silicate glass insulating film, a borate/phosphate/silicate glass insulating film or a silicon oxide insulating film formed by decomposition of tetraethoxysilane.

The reasons why the various constituents of polishing composition were specified or restricted in the present invention will be described below:

(1) The Sol or Gel of Silica as the Polishing Agent

The sol or gel of silica suspended in water as polishing agent includes all of stable dispersed particles of amorphous silica, and may be obtained in any kind of wet-type silica gel deflocculation, ion exchange method, hydrolysis of organic silicate, and so on. In water, silica particles have a primary particle size of about 2 to 500 μm. The concentration of silica could be in a range within about 2% to 50% by weight in use as polishing composition. In most usages, the range of silica solid weight from 10% to 30% is preferable.

In use for polishing operation, the slurry is diluted to have a desired concentration and viscosity. Preferably, this slurry generally contains silica in the range of from 5 to 50% by weight.

(2) Parsulfates as Polishing Accelerator When mixed with water, parsulfates release oxygen gradually which has the effect of increasing the stock removal rate by a function similar to that of oxiderive compounds in a polishing composition for metals as disclosed in the above-mentioned Japanese Patent Post-examination JP-B Nol Sho-53-44273.

If the concentration of a persulfate is less than 2 g/liter, a satisfactoy effect to increase stock removal rate cannot be realized, while above 80 g/liter, the effect does not increase with concentration. Accordingly, the range from 10 to 80 g/liter is preferable in view of the cost and performance balance.

It is preferable to select a persulfate compound from ammonium persulfate, sodium persulfate and potassium persulfate.

It is necessary, however, to add the persulfate at the time of using a polishing composition, because in using such persulfate as a polishing accelerator, if the persulfate is mixed with water in advance, the persulfate releases oxygen and gradually decomposes.

Further, an oxidative compound such as hydrogen peroxide or the like may be added to the above-mentioned parsulfate as a polishing accelerator.

(3) Hydrazine Compound as Polishing Accelerator

In the case of a polishing composition composed of water, various polishing agents and hydrazine compounds as accelerator, the accelerator is composed of any of the following compounds shown in Table A.

TABLE A

| Polishing accelerator | molecular formula |
|---|---|
| Hydrazine hydrate | $N_2H_4 \cdot H_2O$ |
| Hydrazine carbonate | $(N_2H_4)_2 \cdot CO_2$ |
| hydrazine acetate | $N_2H_4 \cdot CH_3COOH$ |
| hydrazine chloride | $N_2H_4 \cdot HCL$ |
| hydrazine sulfate | $N_2H_4 \cdot H_2SO_4$ |

In the case of using a polishing composition containing a hydrazine compound as an accelerator, as usual polishing agents, it is possible to use fumed silica produced by vapor phase silicon dioxide, fine powders of cerium oxide, zirconium oxide, iron oxide or the like, in addition to silicon dioxide such as colloidal silica sol, amorphous silica gel obtained by a wet type process.

In polishing the works, the polishing composition of water slurry is applied to the surface of metals generally at room temperature. Then the surface is polished further with a non-woven type, a suede type, or a hard urethane pad.

Preferred examples of the present invention will be described below.

EXAMPLE 1

Colloidal silica slurry with particle size of 30 nm and 30% by weight of $SiO_2$ concentration, which is commercially available was diluted to make the $SiO_2$ concentration be 10% by weight. Each of polishing accelerators such as ammonium persulfate, sodium persulfate, potassium persulfate, hydrogen peroxide and so on was added to 1 liter of the prepared water slurry to thereby prepare polishing compositions respectively having compositions shown in Table 1.

The concentration of the hydrogen peroxide in Table 1 is expressed by the calculated value from the commercial hydrogen peroxide as 30% by weight.

With these polishing compositions, tungsten plates were polished under specified conditions. After the polishing, the stock removal rate was determined and the formation of surface defects such as orange peel, scratch and so on were observed visually. The results are shown in Table 1.

TABLE 1

| | Polishing accelerator | Concentration of the accelerator (g/liter) | Stock removal rate (μ/min) | Surface defects |
|---|---|---|---|---|
| conventional example | no | 0 | 0.04 | orange peel |
| the same | hydrogen peroxide | 6 | 0.21 | no |
| present invention | ammonium persulfate | 10 | 0.39 | no |
| the same | the same | 20 | 0.45 | no |
| the same | the same | 40 | 0.55 | no |
| the same | the same | 80 | 0.47 | no |
| the same | sodium persulfate | 40 | 0.35 | no |
| the same | potassium persulfate | 40 | 0.38 | no |
| the same | ammonium persulfate and hydrogen peroxide | 40 6 | 0.50 | no |
| the same | sodium persulfate and hydrogen peroxide | 40 6 | 0.42 | no |
| the same | potassium persulfate and hydrogen peroxide | 40 6 | 0.45 | no |

(Polishing conditions)
Polishing machine: lens polishing machine
Polishing pressure: 160 g/cm$^2$
Revolution: 130 rpm
Polishing pad: non-woven type polishing pad
Polishing time: 30 minutes
Slurry feed rate: 20 cc/min
Work: tungsten (18 mmφ, 1 mmt, five pieces)

As shown in Table 1, by adding ammonium persulfate, sodium persulfate or potassium persulfate as an accelerator, or further adding hydrogen peroxide to one of these persulfates, and observing the stock removal rate and the defects in the surfaces, it came out that the addition of these accelerators improved the stock removal rate greatly without formation of any defects such as orange peel in the surfaces.

On the other hand, when no accelerator was added, the stock removal rate was low, and orange peel was found. If only hydrogen peroxide was added, no surface defects were found but the removal rate remained low.

Of the persulfates, ammonium persulfate, was most effective in terms of stock removal rate, in which the highest removal rate was given at a concentration of about 40 g/liter.

Accordingly, it is understood that a polishing composition of the present invention increases the stock removal rate of tungsten greatly and improves the quality of the polished surface.

EXAMPLE 2

Aluminum and copper substrates were polished in the same manner as in Example 1. The results are shown in Tables 2 and 3 respectively.

TABLE 2

| | Polishing accelerator | Concentration of the accelerator (g/liter) | Stock removal rate of Copper (μ/min) | Surface defects |
|---|---|---|---|---|
| Conventional example | no | 0 | 0.11 | orange peel |
| the same | hydrogen peroxide | 6 | 0.18 | no |
| present invention | ammonium persulfate | 40 | 0.26 | no |
| the same | sodium persulfate | 40 | 0.31 | no |
| the same | potassium persulfate | 40 | 0.28 | no |

TABLE 3

| | Polishing accelerator | Concentration of the accelerator (g/liter) | Stock removal rate of Copper (μ/min) | Surface defects |
|---|---|---|---|---|
| Conventional example | no | 0 | 0.02 | orange peer |
| the same | hydrogen peroxide | 6 | 0.18 | no |
| present invention | ammonium persulfate | 40 | 0.98 | no |
| the same | sodium persulfate | 40 | 0.70 | no |
| the same | potassium persulfate | 40 | 0.65 | no |

As shown in Tables 2 and 3, it is understood that the polishing accelerators according to the present invention also gives a higher stock removal rate for aluminum and copper than does hydrogen peroxide, which has been used as a conventional accelerator. Further a similar effect can be obtained for titanium or other alloys.

EXAMPLE 3

Various polishing accelerators having molecular formula shown in Table A were added, in the weight ratios shown in Table 4, to slurries respectively containing 10% by weight of silica sol with average primary particle size of 80 nm or fumed silica powder of average primary particle size of 50 nm. With polishing compositions thus prepared, polishing tests were carried out as Examples (3/1) to (3/21). For the sake of comparison, conventional polishing compositions were prepared and polishing tests were carried out as Conventional Examples (3/1) and (3/2). Then, polishing tests were carried out under the following conditions. The results are shown in Table 4.

TABLE 4

| | Polishing agent (silicon dioxide) | Accelerator | (weight %) | Stock Removal rate (μ/min) | Surface defects (orange peel) |
|---|---|---|---|---|---|
| conventional example (3/1) | colloidal silica | no | 0 | 0.062 | yes |
| conventional example (3/2) | fumed silica | no | 0 | 0.110 | yes |
| example (3/1) | colloidal silica | hydrazine hydrate | 0.1 | 0.115 | no |
| example (3/2) | the same | the same | 0.3 | 0.140 | no |
| example (3/3) | the same | the same | 0.6 | 0.156 | no |
| example (3/4) | the same | the same | 1.2 | 0.186 | no |
| example (3/5) | the same | the same | 2.5 | 0.180 | no |
| example (3/6) | the same | the same | 5.0 | 0.171 | no |
| example (3/7) | the same | hydrazine carbonate | 0.3 | 0.134 | no |
| example (3/8) | the same | the same | 1.2 | 0.165 | no |
| example (3/9) | the same | the same | 5.0 | 0.151 | no |
| example (3/10) | the same | hydrazine acetate | 1.2 | 0.101 | no |
| example (3/11) | the same | hydrazine | 1.2 | 0.124 | no |

TABLE 4-continued

|  | Polishing agent (silicon dioxide) | Accelerator | (weight %) | Stock Removal rate (μ/min) | Surface defects (orange peel) |
|---|---|---|---|---|---|
| example (3/12) | the same | hydrazine sulfate | 1.2 | 0.113 | no |
| example (3/13) | fumed silica | hydrazine hydrate | 0.3 | 0.198 | no |
| example (3/14) | the same | the same | 1.2 | 0.278 | no |
| example (3/15) | the same | the same | 5.0 | 0.203 | no |
| example (3/16) | the same | hydrazine carbonate | 0.3 | 0.183 | no |
| example (3/17) | the same | the same | 1.2 | 0.253 | no |
| example (3/18) | the same | the same | 5.0 | 0.210 | no |
| example (3/19) | the same | hydrazine acetate | 1.2 | 0.162 | no |
| example (3/20) | the same | hydrazine chloride | 1.2 | 0.181 | no |
| example (3/21) | the same | hydrazine sulfate | 1.2 | 0.172 | no |

(Polishing conditions)
Polishing machine: sheet-fed type single sided polishing machine
Polishing pressure: 300 g/cm$^2$
revolution: 100 rpm
Polishing pad: hard polyurethane pad
Polishing time: 6 minutes
Work: SiO$_2$ film on silicon wafer (SiO$_2$ film was formed up to about 2 μm thickness on a 4" φ silicon wafer by thermal oxidation)

As shown in Table 4, as the result of adding such hydrazine compounds as a polishing accelerator, and observing the stock removal rate and the surface defects such as orange peel it became evident that the addition of these polishing accelerators improved the stock removal rate greatly without producing any surface defect such as orange peel. On the other hand, when no polishing accelerator was added, the stock removal rate was low, and the formation of orange peel was observed. Accordingly, a polishing composition of the present invention can improve the stock removal rate of SiO$_2$ insulating film greatly, and can improve the quality of the polished surface, effectively in flattening an inter-layer insulating film.

EXAMPLE 4

In the same manner as in Example 3, hydrazine hydrate or hydrazine carbonate whose molecular formula are shown in Table A were added as the polishing accelerators to slurries respectively containing cerium oxide powder (average particle size of 0.5 μ), zirconium oxide powder (average particle size of 0.2 μ) and iron oxide powder (average particle size of 0.1 μ) as polishing agents, in the weight ratios shown in Table 5. With polishing compositions thus prepared, polishing tests were carried out as Examples (4/22) to (4/27). For the sake of comparison, conventional polishing compositions were prepared, and the tests were carried out as Conventional Examples (4/3) to (4/5). The polishing conditions were the same as those in Example 1, except that the polishing time was 3 minutes. The results are shown in Table 5.

TABLE 5

|  | Polishing agent | Accelerator | (weight %) | Stock removal rate (μ/min) | Surface defects (micro-scratch) |
|---|---|---|---|---|---|
| Conventional example (4/3) | cerium oxide | no | 0 | 0.41 | many |
| Conventional example (4/4) | zirconium oxide | no | 0 | 0.19 | many |
| conventional example (4/5) | iron oxide | no | 0 | 0.23 | many |
| example (4/22) | cerium oxide | hydrazine hydrate | 1.2 | 0.63 | no |
| example (4/23) | the same | hydrazine carbonate | 1.2 | 0.51 | no |
| example (4/24) | zirconium oxide | hydrazine Hydrate | 1.2 | 0.28 | no |
| example (4/25) | the same | hydrazine carbonate | 1.2 | 0.25 | no |
| example (4/26) | iron oxide | hydrazine | 1.2 | 0.37 | no |

TABLE 5-continued

|  | Polishing agent | Accelerator | (weight %) | Stock removal rate (μ/min) | Surface defects (micro-scratch) |
|---|---|---|---|---|---|
| example (4/27) | the same | hydrate hydrazine carbonate | 1.2 | 0.33 | no |

As shown in Table 5, as the result of adding such hydrazine compounds as polishing accelerators and observing the stock removal rate and surface defect such as micro-scratch, it was understood that the addition of these polishing accelerators further improved the stock removal rate without formation of any surface defect such as micro-scratch.

On the other hand, when no polishing accelerator was added, the stock removal rate was low, and the formation of micro-scratch was observed though there was no orange peel. Accordingly, a polishing composition of the present invention can improve the polishing rate for $SiO_2$ insulating film, and can improve the quality of the polished surface, effectively in flattening various inter-layer issulating films.

As has been described above, since the polishing composition of the present invention is composed of water, a polishing agent and polishing accelerators selected from persulfates, hydrogen peroxide, or hydrazine compound, it is possible to improve the stock removal rate and improve the quality of polished surface greatly in comparison with the conventional polishing compositions. Consequently, it is a technique capable of coping with the requirements for high integration of VLSI devices and circuit patterns of various metals and/or inter-layer insulating films formed on silicon substrates can be flattened at high speed and with high quality. Since the yield is also improved, the cost can be further reduced.

What is claimed is:

1. In a polishing composition comprising a slurry of silica particles in water wherein the silica particles are present in the slurry in a size and amount sufficient to render the composition effective in removing a metal from the surface of an integrated circuit by polishing, the improvement wherein the composition consists essentially of water, a sol or gel of silica and a persulfate compound as a polishing accelerator, said persulfate compound being included in the composition in an amount sufficient to increase the effectiveness of the composition in removing the metal by polishing without formation of orange peel on the surface of the integrated circuit.

2. A polishing composition according to claim 1, in which said persulfate compound is selected from the group consisting of ammonium persulfate, sodium persulfate and potassium persulfate.

3. In a polishing composition comprising a slurry of silica particles in water wherein the silica particles are present in the slurry in a size and amount sufficient to render the composition effective in removing a metal from the surface of an integrated circuit by polishing, the improvement wherein the metal to be removed from the surface of the integrated circuit is aluminum or tungsten and the composition comprises a polishing accelerator which consists essentially of hydrogen peroxide and a persulfate compound, said persulfate compound being included in the composition in an amount sufficient to increase the effectiveness of the composition in removing the aluminum or tungsten by polishing without formation of orange peel on the surface of the integrated circuit.

4. A polishing composition according to claim 3, in which said polishing accelerator is hydrogen peroxide and a persulfate compound selected from the group consisting of ammonium persulfate, sodium persulfate and potassium persulfate.

5. A polishing composition according to claim 1, wherein said metal to be removed from the surface of integrated circuit by polishing is selected from the group consisting of Al, Cu and W.

* * * * *